United States Patent
Sakuma et al.

(10) Patent No.: US 7,141,265 B2
(45) Date of Patent: Nov. 28, 2006

(54) OIL/FAT POWDER

(75) Inventors: Tadashi Sakuma, Tokyo (JP);
Yoshinobu Nakajima, Tokyo (JP);
Hiroyuki Yamashita, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/502,805

(22) PCT Filed: Feb. 17, 2003

(86) PCT No.: PCT/JP03/01631

§ 371 (c)(1),
(2), (4) Date: Aug. 6, 2004

(87) PCT Pub. No.: WO03/067999

PCT Pub. Date: Aug. 21, 2003

(65) Prior Publication Data

US 2005/0123667 A1    Jun. 9, 2005

(30) Foreign Application Priority Data

Feb. 18, 2002  (JP) ............................. 2002-039775
Dec. 24, 2002  (JP) ............................. 2002-372508

(51) Int. Cl.
    *A23D 9/07* (2006.01)
(52) U.S. Cl. ...................... 426/601; 426/606
(58) Field of Classification Search ................ None
    See application file for complete search history.

(56) References Cited

U.S. PATENT DOCUMENTS

| | | | |
|---|---|---|---|
| 3,514,298 A | * | 5/1970 | Noznick et al. ............ 426/658 |
| 4,656,045 A | * | 4/1987 | Bodor et al. ............... 426/601 |
| 4,737,369 A | * | 4/1988 | Asano et al. ................ 426/98 |
| 5,658,609 A | * | 8/1997 | Abboud et al. ............. 426/609 |
| 5,912,042 A | * | 6/1999 | Cain et al. .................. 426/607 |
| 6,106,879 A | * | 8/2000 | Mori et al. ................. 426/438 |
| 6,287,624 B1 | * | 9/2001 | Mori et al. ................. 426/601 |
| 6,764,708 B1 | * | 7/2004 | Suzuki et al. .............. 426/601 |
| 6,844,021 B1 | * | 1/2005 | Koike et al. ............... 426/611 |
| 2001/0036502 A1 | * | 11/2001 | Koike et al. ............... 426/608 |
| 2003/0021877 A1 | * | 1/2003 | Cain et al. .................. 426/601 |
| 2003/0198727 A1 | * | 10/2003 | Koike et al. ............... 426/601 |
| 2004/0052920 A1 | * | 3/2004 | Koike et al. ............... 426/601 |
| 2004/0062847 A1 | * | 4/2004 | Koike et al. ............... 426/601 |
| 2004/0202770 A1 | * | 10/2004 | Cain et al. .................. 426/601 |

FOREIGN PATENT DOCUMENTS

WO    02 11550    2/2002
WO    02 11552    2/2002

OTHER PUBLICATIONS

Schwartzberg, H. G. et al. 1992. Physical Chemistry of Foods, Marcel Dekker, Inc., New York, p. 365.*
U.S. Appl. No. 10/857,020, filed Jun. 1, 2004, Moriwaki et al.
U.S. Appl. No. 10/502,805, filed Aug. 6, 2004, Sakuma et al.

* cited by examiner

*Primary Examiner*—Carolyn Paden
(74) *Attorney, Agent, or Firm*—Oblon, Spivak, McClelland, Maier & Neustadt, P.C.

(57) ABSTRACT

Provided is an oil/fat powder comprising the following Components (A), (B) and (C): (A) 15 to 79.9 wt. % of a glyceride mixture containing 5 to 84.9 wt. % of triglycerides, 0.1 to 5 wt. % of monoglycerides and 15 to 94.9 wt. % of diglycerides, and having, as at least 50 wt. % of all the constitutive fatty acids, unsaturated fatty acids; (B) 20 to 84.9 wt. % of one or at least two powder forming bases selected from carbohydrates, proteins and peptides; (C) 0.1 to 5 wt. % of water. The diglyceride-containing oil/fat powder according to the present invention exhibits good taste, and excellent dispersibility in water and storage stability. Moreover, owing to good handling use and workability when it is added to food, it can be used readily for various forms of foods. Foods containing this oil/fat powder taste good and have good storage stability.

16 Claims, No Drawings

OIL/FAT POWDER

TECHNICAL FIELD

The present invention relates to an oil/fat powder which contains diglycerides, is excellent in taste, texture, storage stability and dispersibility in water, and has good dispersibility in powders such as protein and carbohydrate; and a processed food containing the oil/fat powder.

BACKGROUND ART

When an oil/fat-containing processed food is produced, there is a demand for using particularly a powdered oil/fat in consideration of easy handling, workability, and easy application to foods of various forms. A number of powdering techniques of an oil/fat containing mainly triglycerides have conventionally been disclosed (for example, Japanese Patent Laid-Open No. 50-110403, Japanese Patent Laid-Open No. 56-104998, Japanese Patent Laid-Open No. 57-159896, and Japanese Patent Laid-Open No. 8-56604).

Techniques of making use of partial glycerides for an oil/fat powder are also disclosed. For example, disclosed in Japanese Patent Laid-Open No. 62-210975 is a technique of covering an oil/fat powder with medium-chain fatty acid mono-diglycerides, thereby improving its dispersibility in cold water. This technique is however accompanied with the drawbacks that addition of the covering step makes the preparation process cumbersome, dispersibility in powder such as protein and carbohydrate is inferior owing to the low content of medium-chain fatty acid mono-diglycerides and the medium-chain fatty acids introduce an undesirable taste peculiar thereto.

In Japanese Patent Laid-Open No. 6-172782, proposed is a technique relating to a highly-unsaturated-fatty-acid-containing monoglyceride powder. This technique makes it possible to impart the powder with excellent water dispersibility but the powder lacks in rich oil taste and has an undesirable taste, thus is not satisfactory.

In Japanese Patent Laid-Open No. 6-271892, disclosed is a technique of solidifying a glyceride oil/fat containing, as a constitutive fatty acid, highly unsaturated fatty acids by mixing it with Zein. But, hydrolysis of the glyceride cannot be suppressed, leading to insufficient taste and storage stability.

In addition, a cooking oil/fat containing partial glycerides having a sum of a saponification value and a hydroxyl value falling within a predetermined range, and a powder thereof are disclosed (Japanese Patent Application Laid-Open No. 2000-217513). The oil/fat however has problems in taste such as shortage of oil taste and storage stability and at the same time, cakes are formed during preparation.

It is known from the previous researches that diglycerides have effects for suppressing body fat accumulation (Japanese Patent Laid-Open No. 4-300826, Japanese Patent Laid-Open No. 10-176181). It is very important to powder an oil/fat containing diglycerides having a unique health-promoting function, more specifically, capable of suppressing body fat accumulation in order to expand its application range.

Only application of the conventional powdering technique to a diglycerides-rich oil/fat however sometimes causes such problems as that the oil/fat thus powdered is insufficient in taste, texture and storage stability, and that a large amount of cakes appear during preparation.

An object of the present invention is therefore to provide an oil/fat powder containing diglycerides, being excellent in taste, texture, storage stability and dispersibility in water, and at the same time, having good dispersibility in powders such as protein and carbohydrate; and a processed food containing the oil/fat powder.

DISCLOSURE OF THE INVENTION

The present inventors have carried out an investigation to overcome the above-described problems. As a result, it has been found that an oil/fat powder obtained by incorporating predetermined amounts of a specific powder forming base and water in a specific glyceride mixture containing diglycerides is excellent in taste, texture, storage stability and dispersibility in water, and has excellent workability owing to good dispersibility in powders such as protein and carbohydrate, and formation of cakes upon preparation is suppressed by adding a specific emulsifier.

In the present invention, there are thus provided:

an oil/fat powder comprising the following Components (A), (B) and (C):

(A) 15 to 79.9 wt. % of a glyceride mixture containing 5 to 84.9 wt. % of triglycerides, 0.1 to 5 wt. % of monoglycerides and 15 to 94.9 wt. % of diglycerides, at least 50 wt. % of all the fatty acids constituting said glyceride mixture being unsaturated fatty acids;

(B) 20 to 84.9 wt. % of one or at least two powder forming bases selected from carbohydrates, proteins and peptides;

(C) 0.1 to 5 wt. % of water.

And a processed food containing the oil/fat powder is also provided.

DETAILED DESCRIPTION OF THE PREFERRED EMBODIMENTS

The glyceride mixture to be used as Component (A) in the present invention is incorporated in the oil/fat powder of the present invention in an amount of from 15 to 79.9 wt. % (which will hereinafter be called "%", simply), preferably from 20 to 79.9%, more preferably from 25 to 79.9%, especially preferably from 30 to 74.9%, most preferably from 40 to 69.9% in consideration of exhibition of a rich taste peculiar to the oil/fat and suppression in oozing-out thereof.

The diglyceride content in Component (A) ranges from 15 to 94.9%, preferably from 20 to 94.9%, more preferably from 40 to 94.9%, especially preferably from 60 to 94.9%, most preferably from 70 to 91.9%. It must be at least 15% for improving dispersibility in water or a powder forming base and 94.9% or less when industrial productivity is taken into consideration.

Diglycerides include 1,2-diglyceride and 1,3-diglyceride, but 1,3-diglyceride is preferred. An oil/fat having a 1,3-diglyceride content of 15% or greater inhibits a rise in the neutral fat level in blood, suppresses accumulation of a body fat and moreover, has good storage stability and taste. Accordingly, it is preferred to use diglycerides having a higher 1,3-diglyceride content and prepare an oil/fat powder by using a glyceride mixture having a 1,3-diglyceride content of 15% or greater, particularly 40% or greater.

The diglyceride having, as 70 to 100%, preferably 80 to 100%, more preferably 90 to 100% of the constitutive fatty acids thereof, unsaturated fatty acids, particularly, unsaturated fatty acids having 8 to 24 carbon atoms, more prefer ably 12 to 22 carbon atoms, especially 16 to 22 carbon atoms is desired from the viewpoints of physiological effects, texture and prevention of cake formation.

In addition, the diglyceride having, as 15 to 90%, preferably 20 to 80%, more preferably 30 to 70%, especially preferably 40 to 65% of the constitutive fatty acids thereof, an ω3 unsaturated fatty acid is desired from the viewpoints of reinforcement of physiological effects, stability against oxidation and taste. The term "ω3 unsaturated fatty acid" as used herein means an unsaturated fatty acid having a first unsaturated carbon-carbon bond at the third carbon atom from the ω position and having at least two unsaturated carbon-carbon bonds. Specific examples include α-linolenic acid, stearidonic acid, eicosapentaenoic acid and docosahexaenoic acid. Of these, α-linolenic acid is particularly preferred. The α-linolenic acid content of the ω3 unsaturated fatty acid is preferably 50% or greater, preferably 70% or greater, more preferably 100%.

Moreover, the diglyceride having, as the constitutive fatty acid, 1 to 60%, preferably 5 to 50%, especially 10 to 40% of an ω9 unsaturated fatty acid is desired in stability against oxidation and intake balance of fatty acids. Examples of the ω9 unsaturated fatty acid include those having 8 to 24, preferably 16 to 22 carbon atoms, such as oleic acid, eicosamonoenoic acid and docosamonoenoic acid. Of these, oleic acid is particularly preferred. An olein-olein diglyceride content is preferably less than 45%, especially 40% or less in consideration of the expression of physiological activity.

The diglyceride preferably contains, as the remaining constitutive fatty acid, 2 to 80%, preferably 5 to 70%, more preferably 10 to 60% of an ω6 unsaturated fatty acid having 18 to 22 carbon atoms such as linoleic acid and γ-linolenic acid in consideration of stability against oxidation, intake balance of fatty acids, and expression of physiological activity of the ω3 unsaturated fatty acid. From the viewpoint of taste, the content of a saturated fatty acid having 12 or less carbon atoms is 10% or less, preferably 5% or less, more preferably 0.5% or less, most preferably 0%.

The triglyceride content of Component (A) is 5 to 84.9%, preferably 5 to 79.9%, more preferably 5 to 59.9%, especially preferably 5 to 39.9%, most preferably 8 to 29.9% from the viewpoints of taste and industrial productivity.

It is preferred from the viewpoints of texture and prevention of cake formation that the triglyceride has, as a constitutive fatty acid thereof, 50 to 100%, preferably 70 to 100%, more preferably 80 to 100%, especially 90 to 100% of an unsaturated fatty acid having 8 to 24, preferably 14 to 22 carbon atoms. The triglyceride is preferably constituted of, similar to the diglyceride, an ω3 unsaturated fatty acid, ω9 unsaturated fatty acid and ω6 unsaturated fatty acid. The content of fatty acids having 12 or less carbon atoms is 10% or less, preferably 5% or less, more preferably 0.5% or less, most preferably 0% from the viewpoint of taste or flavor.

When the diglyceride has, as the constitutive fatty acid thereof, 15 to 90% of an ω3 unsaturated fatty acid, the triglyceride preferably has, as the constitutive fatty acid thereof, 15% or less, more preferably 0.5 to 12%, especially 1 to 10% of the ω3 unsaturated fatty acid in consideration of stability against oxidation, physiological effects and cost.

When the diglyceride has, as the constitutive fatty acid thereof, less than 15% of an ω3 unsaturated fatty acid, the triglyceride preferably has, as the constitutive fatty acid, 15 to 90% of the ω3 unsaturated fatty acid in consideration of stability against oxidation, physiological effects and cost. The content is more preferably 20 to 60%, especially 25 to 50%. The α-linolenic acid content of the ω3 unsaturated fatty acid is preferably 50% or greater, preferably 70% or greater, more preferably 100%.

The monoglyceride content of Component (A) is 0.1 to 5%, preferably 0.1 to 2%, more preferably 0.1 to 1.5%, still more preferably 0.1 to 1%, especially preferably 0.1 to 0.5% from the viewpoints of taste, texture and dispersibility. It is preferred from the viewpoints of taste and texture that the monoglyceride has, as the constitutive fatty acid thereof, 50 to 100%, preferably 70 to 100%, more preferably 80 to 100%, especially preferably 90 to 100% of an unsaturated fatty acid preferably having 8 to 24, especially 14 to 22 carbon atoms. The monoglyceride is preferably constituted of, similar to the diglyceride, an ω3 unsaturated fatty acid, ω9 unsaturated fatty acid and ω6 unsaturated fatty acid.

The content of a linear free fatty acid (salt) having 9 to 24 carbon atoms in Component (A) is desirably reduced to 3.5% or less, preferably 2.5% or less, more preferably 1.5% or less, especially 1% or less, most preferably 0.5% or less when taste and storage stability are taken into consideration.

At least 50% of all the constitutive fatty acids of the glyceride mixture as Component (A) is an unsaturated fatty acid. In consideration of texture and prevention of cake formation, this percentage is preferably 50 to 100%, especially 70 to 100%, still more preferably 90 to 100%. The unsaturated fatty acid preferably has 8 to 24, more preferably 12 to 22, especially 14 to 22 carbon atoms and that containing an ω3 unsaturated fatty acid, ω9 unsaturated fatty acid and ω6 unsaturated fatty acid within the above-described range is desired. For example, oleic acid, linoleic acid and linolenic acid are preferred.

The glyceride mixture to be used as Component (A) in the present invention is available by using a diglyceride-containing oil/fat, which has been obtained by any method such as hydrolysis of an oil/fat, transesterification reaction between an oil/fat and glycerin, esterification reaction between fatty acids derived from an oil/fat and glycerin, alone or in combination with another oil/fat and optionally adding an antioxidant. The above-described reaction can be replaced with chemical reaction using an alkali catalyst or biochemical reaction using an enzyme such as lipase, but reaction under enzymatically mild conditions using 1,3-selective lipase is preferred because of excellent taste.

The monoglyceride prepared in excess by the above-described reaction can be removed by thin-film evaporation or chromatography.

Examples of the oil/fat to be used in the above-described reaction include ordinarily employed edible oils/fats such as vegetable oils and animal oils/fats, more specifically, vegetable oils such as safflower oil, olive oil, cotton seed oil, rapeseed oil, corn oil, soybean oil, linseed oil, perilla oil, palm oil, palm kernel oil, sunflower oil, sesame oil, rice oil, and coconut oil, animal oils such as lard, beef tallow and fish oil, and hydrogenated oils, fractionated oils and transesterified oils thereof.

Examples of the powder forming base to be used as Component (B) in the present invention include carbohydrates such as monosaccharide, oligosaccharide and polysaccharide, protein and peptide.

The oil/fat powder of the present invention contains the powder forming base as Component (B) in an amount of 20 to 84.9%, preferably 20 to 79.8%, more preferably 20 to 74.5%, especially preferably 20 to 74.9%, most preferably 25 to 69.9%. The content of the base must be at least 20% in order to prevent oozing out of the oil and 84.9% or less in consideration of the taste, dispersibility and industrial productivity.

Examples of the carbohydrate include sugar alcohols such as glucose, fructose, maltose, lactose, sucrose and trehalose, starches, polysaccharide thickeners, and gum substances. As the starch, corn starch, potato starch, tapioca starch, dextrin, cyclodextrin, oxidized starch, starch ester, starch ether, crosslinked starch, alpha starch or octenylsuccinate ester, or processed starch obtained by treating a starch by an acid, heat or enzyme is used as needed. Of these, dextrin is preferred, with that having a dextrose equivalent (which will hereinafter be abbreviated as "DE") (percentage (%) of reducing sugar, calculated in terms of glucose, in dextrin) of 8 to 45, more preferably 10 to 30, especially 12 to 25 being desired. As the polysaccharide thickener·gum substance, one or a mixture of two or more derived from seaweed, seed, microorganism or resin is usable. Specific examples include pullulan, sodium alginate, xanthan gum, guar gum, locust bean gum, tragacanth gum, tamarind gum, carrageenan, furcellaran, gum arabic, Gellan gum, psyllium, curdlan, konjac mannan, pectin, agar, and cellulose derivatives such as carboxymethyl cellulose.

Examples of the protein or peptide include proteins such as those derived from animals or vegetables such as milk, egg, meat, wheat, rice, soybean and corn, and those obtained by separation or decomposition of the above-described proteins, a mixture of more than one of these proteins, and complexes (lipoproteins) thereof with a lipid. Specific examples include casein, whey, gelatin, skim milk, soybean globulin, egg albumen, and yolk protein.

These powder forming bases (B) may be used either singly or in combination of any two or more, but use of dextrin and the protein in combination is more preferred from the viewpoint of the emulsion stability of the glyceride mixture as Component (A) and storage stability of the oil/fat powder, with use of dextrin having DE of from 8 to 45 and casein in combination being particularly preferred.

In the oil/fat powder of the present invention, water content of Component (C) ranges from 0.1 to 5%, preferably from 0.2 to 4.5%, more preferably from 0.5 to 4%, especially preferably from 1 to 4%, most preferably from 1.5 to 3.5%. In view of industrial productivity, the water content of 0.1% or greater is preferred. When it exceeds 5%, cakes appear upon preparation and the oil/fat powder thus obtained has poor storage stability and reduced dispersibility in water.

Addition of an antioxidant to the oil/fat powder of the present invention is preferred in order to prevent deterioration due to oxidation of Component (A), thereby improving storage stability and improving stability of taste. Examples of the antioxidant include tocopherols, L-ascorbic acid or salts thereof, L-ascorbyl fatty acid esters, natural antioxidant components, butylated hydroxy toluene (BHT), butylated hydroxy anisole (BHA), tert-butyl hydroquinone (TBHQ) and phospholipid.

As the tocopherol, that soluble in Component (A) is preferred and α, β, γ, or δ-tocopherol, or a mixture thereof is used. Examples of the commercially available tocopherol include "E MIX D", "E MIX 80" (each, product of Eisai), "MDE-6000" (product of Yashiro), "E Oil-400", "E Oil-600", "E Oil-805" (each, product of Riken Vitamin) and "MIXED TOCOPHEROLS MTS-50" (product of ADM).

As the L-ascorbyl fatty acid ester, those soluble in Component (A) are preferred, of which higher fatty acid esters, for example, those having a $C_{12-22}$ acyl group are more preferred, with L-ascorbyl palmitate and L-ascorbyl stearate being particularly preferred.

As the natural antioxidant component, rosemary extract and water-soluble tea extracts (catechins) are especially preferred because of having a high antioxidative property.

The rosemary extract is obtained by extracting leaves of rosemary, which belongs to the labiate family, with an organic solvent. As the rosemary extract, that soluble in Component (A) is preferred. Usable are the above-described extract with an organic solvent, oleoresin preparations using the extract, preparations using the constituent of the rosemary extract such as rosemanol, carnosol and isorosmanol, and these extracts further subjected to deodorizing treatment by pressure reduction or column adsorption. Of these, deodorized extracts having a remaining solvent amount of 20 ppm or less are preferred in consideration of taste. Examples of the commercially available rosemary extract include "Herbalox brand type O", "the same type HT-O", "the same type 25", "Duolite NMH", "ditto NM-1" (each, product of Kalsec), "Leomeal E", "ditto IO" (each, product of Lion).

The water-soluble tea extracts (catechins) are concentrates of the extract obtained by extracting tea leaves of green tea, semi-fermented tea or fermented tea with a solvent, water or hot water, followed by filtration and drying. The term "catechins" is a generic name including non-epi catechins such as catechin, gallocatechin, catechin gallate and gallocatechin gallate and epi catechins such as epicatechin, epigallocatechin, epicatechin gallate and epicallocatechin gallate.

The catechins soluble or dispersible in Component (A) are preferred. Examples of the commercially available catechins include "Polyphenon" (product of Mitsui Norin Group), "Thea-flan" (product of Itoen), "Sunphenon" (product of Taiyo Chemical), "Sun-oolong" (product of Suntory) and "YMC Catechin" (product of YMC).

As the natural antioxidant component other than the above-described rosemary extract and water-soluble tea extract, apple polyphenol ("Applephenone", product of San-Ei Gen F.F.I.) and sunflower seed extract ("Heliant", product of DAINIPPON INK AND CHEMICALS) can be given as examples.

Particularly in the case where Component (A) has poor stability against oxidation or the oil/fat powder is required to have high storage stability, use of two or more of the above-described antioxidants in combination is preferred, compared with a single use in an increased amount. A mixture of tocopherol, L-ascorbyl fatty acid ester and an antioxidant derived from a vegetable is particularly preferred as the antioxidant.

When the antioxidant is added to the oil/fat powder of the present invention, its content ranges from 0.01 to 5 parts by weight, more preferably from 0.01 to 3 parts by weight, especially from 0.01 to 2 parts by weight in total based on 100 parts by weight of Component (A), whereby the oil/fat powder can be imparted with good antioxidative property. For the preparation of an oil or fat in the powder form, the antioxidant is preferably dissolved or dispersed in Component (A) or Component (B).

In the oil/fat powder of the present invention, it is preferred to incorporate a phytosterol for the purpose of imparting the powder with blood cholesterol level lowering action. Preferred examples of the phytosterol include α-sitosterol, β-sitosterol, stigmasterol, campesterol, α-sitostanol, β-sitostanol, stigmastanol, campestanol and cycloartenol, and fatty acid esters, ferulate esters, cinnamate esters and glycosides thereof. These phytosterols are each preferably added in an amount of from 0.05 to 20 parts by weight, more preferably from 0.3 to 10 parts by weight, especially preferably from 0.3 to 4.7 parts by weight, most preferably from 1.2 to 4.7 parts by weight, based on 100 parts by weight of Component (A).

To the oil/fat powder of the present invention, an organic acid, more specifically, a hydrocarboxylic acid, dicarboxylic acid or tricarboxylic acid having 2 to 8 carbon atoms or salt thereof is desirably added in order to attain further improvements in taste and storage stability. The organic acid is added in an amount of from 0.001 to 0.5 part by weight, more preferably from 0.012 to 0.3 part by weight, especially from 0.015 to 0.1 part by weight, still more preferably from 0.025 to 0.07 part by weight, based on 100 parts by weight of Component (A). The organic acid has 2 to 8, preferably 2 to 6, more preferably 4 to 6 carbon atoms. Preferred examples include citric acid, succinic acid, maleic acid, oxalic acid, aconitic acid, itaconic acid, citraconic acid, tartaric acid, fumaric acid and malic acid. Of these, citric acid, tartaric acid and malic acid are preferred, with citric acid being especially desired.

To the oil/fat powder of the present invention, an emulsifier is preferably added in consideration of texture, emulsifiability upon preparation and prevention of cake formation upon drying. Particularly when the oil/fat powder of the present invention is prepared by spray drying, addition of an emulsifier is preferred for attaining good texture and preventing cake formation. The emulsifier has preferably an HLB value of 7 or greater, more preferably from 7 to 20, especially from 11 to 16. The "HLB value" can be calculated in accordance with the equation of Griffin (Literature: J. Soc. Cosmet. Chem., 1, 311(1949)). Examples of such an emulsifier include polyglycerin fatty acid esters, sorbitan fatty acid esters, polyoxyethylene sorbitan fatty acid esters, propylene glycol fatty acid esters, sucrose fatty acid esters, lecithin, lecithins such as enzymatically decomposed lecithin, glycerin monofatty acid esters, and organic acid esters of monoglycerides such as acetylated monoglyceride, lactylated monoglyceride and citrated monoglyceride.

These emulsifiers may be used either singly or in combination of any two or more. Use of one or at least two selected from polyglycerin fatty acid esters, sucrose fatty acid esters, sorbitan fatty acid esters, lecithins, and polyoxyethylene sorbitan fatty acid esters is preferred from the viewpoint of emulsion stability of Component (A). Of these, sucrose fatty acid esters and polyglycerin fatty acid esters are particularly preferred. The HLB value when two or more emulsifiers are used in combination can be determined from the weighted average of the HLB numbers of these emulsifiers.

In the oil/fat powder of the present invention, the emulsifier is preferably incorporated in an amount of from 0.1 to 20 parts by weight, more preferably from 1 to 10 parts by weight, especially from 2 to 7 parts by weight, based on 100 parts by weight of Component (A).

The oil/fat powder of the present invention can be prepared, for example, by mixing an oil phase composed mainly of Component (A) and an aqueous phase composed mainly of water and Component (B) in the presence of an emulsifier by an emulsifying machine to obtain the corresponding Oil-in-water emulsion (O/W emulsion) and then removing water therefrom.

Water can be removed by any method selected from spray drying, spray freezing, freeze drying, freeze pulverization and extruding granulation. The oil/fat powder thus obtained is used for an oil/fat-containing processed food after sifting, granulation and pulverization as needed.

The weight average particle size of the oil/fat powder in the present invention is preferably from 250 to 3500 μm, more preferably from 270 to 1800 μm, especially from 300 to 900 μm, still more preferably from 330 to 600 μm in order to attain good workability and texture. This particle size is available by the method specified in JIS K0069-1997.

When water is removed by employing an ordinarily employed spray drying method, Component (B) and optionally, an emulsifier are added to water and an uniform aqueous solution is prepared, if necessary, by heating. The solution thus obtained serves as the aqueous phase. This aqueous phase has preferably a viscosity of from 5 to 500 mPa·s, more preferably from 30 to 500 mPa·s in consideration of emulsion stability and stirring efficiency of the aqueous phase or emulsion.

Then, Component (A) optionally containing an emulsifier is added to the aqueous phase, followed by emulsification by a forced stirring and dispersing machine such as homomixer or FILMICS, or an emulsifying machine such as high-pressure homogenizer, colloid mill or attritor. The viscosity of the emulsion is preferably 5 to 200 mPa·s from the viewpoint of emulsification efficiency, emulsion stability and smooth discharge of an emulsion from the nozzle in the spray drying step.

The resulting emulsion has preferably a solid content (Component (A)+Component (B)+emulsifier) of from 5 to 60%, more preferably from 10 to 60%, especially from 15 to 50% on a weight base in order to maintain smooth discharge from the nozzle upon spray drying.

The oil/fat powder of the present invention can be prepared by spray drying the emulsion thus obtained.

The oil/fat powder of the present invention is preferably used for preparation of an oil/fat-containing processed food. The term "oil/fat-containing processed foods" as used herein means food obtained by incorporating in the above-described oil/fat powder as well as the other food raw materials and processing the resulting mixture. Examples of the oil/fat-containing processed foods include powdered drink, powdered miso soup, dried soup, powdered sauce, powdered coffee cream, bakery foods such as cookie, cracker, biscuit and short bread, chocolate, chocolate coating agent, premix for french fry, tempura flour, cake premix, and dessert premix. The oil/fat powder is also added to supplements in the form of tablets, capsules or granules.

As the other food materials, seasonings such as salt, sugar, and sodium glutamate, spices such as pepper and flavors are usable. Use of Component (A) of the present invention in combination with a flavor is preferred, because evaporation of the flavor upon spray drying is suppressed and the resulting processed food has good taste.

In the oil/fat-containing processed food of the present invention, the content of the flavor preferably ranges from 0.001 to 5%, especially from 0.01 to 1% from the viewpoint of its taste. The flavor may be used either with an extender or without an extender.

It is preferred from the viewpoints of taste, texture, storage stability and dispersibility that the content of the oil/fat powder of the present invention in the oil/fat-containing processed food is from 1 to 100%, more preferably from 5 to 99.999%, especially from 10 to 99.99%, still more preferably from 20 to 80%, though depending on the kind of the food.

Having generally described this invention, a further understanding can be obtained by reference to certain specific examples which are provided herein for purposes of illustration only and are not intended to be limiting unless otherwise specified.

EXAMPLES

The following oils/fats were prepared.

Component (A): preparation of oils/fats a to c, f and comparative oils/fats d and e (1) Oil/Fat a By using a commercially available lipase preparation "Lipozyme IM" (product of Novo Nordisk Bioindustry, immobilized 1,3-selective lipase), 650 parts by weight of soybean fatty acid and 107 parts by weight of glycerin were subjected to esterification at 0.07 hPa and 40° C. for 5 hours. The enzyme was filtered off, and the residue was subjected to thin-film evaporation at 235° C. After washing with water, deodorization was carried out for 1 hour at 235° C. to obtain the oil/fat a.

(2) Oil/Fat b

In a similar manner to that employed for the preparation of the oil/fat a, 650 parts by weight of rapeseed fatty acid and 107 parts by weight of glycerin were subjected to esterification. The enzyme was filtered off, and the residue was subjected to thin-film evaporation at 235° C. After washing with water, deodorization was carried out for 1 hour at 235° C. to obtain the oil/fat b.

(3) Oil/Fat c

In a similar manner to that employed for the preparation of the oil/fat a, 455 parts by weight of soybean fatty acid having a saturated fatty acid content reduced by wintering, 195 parts by weight of rapeseed fatty acid and 107 parts by weight of glycerin were subjected to esterification. The enzyme was filtered off and the residue was subjected to thin-film evaporation at 235° C. After washing with water, deodorization was carried out for 1 hour at 235° C. to obtain the oil/fat c.

(4) Oil/Fat d

A rapeseed SHIRASHIME oil (product of Honen) was used as the oil/fat d.

(5) Oil/Fat e

A mixture of 94 wt. % of the oil/fat a and 6 wt. % of monoglyceride ("EXCEL O-95R", trade name; product of Kao Corporation) was used as the oil/fat e.

(6) Oil/Fat f

By using Lipozyme IM as in the preparation of the oil a, 650 parts by weight of linseed fatty acid and 107 parts by weight of glycerin were subjected to esterification at 0.07 hPa and 40° C. for 6 hours. The enzyme was filtered off, and the residue was subjected to thin-film evaporation at 215° C. The resulting oil was washed with water, followed by deodorization for 2 hours at 215° C. To the resulting oil was added 25 ppm of citric acid, whereby the oil/fat f was prepared.

The glyceride composition and fatty acid constituents of these oils/fats a to f are shown in Table 1.

TABLE 1

| | | Oil/fat a | Oil/fat b | Oil/fat c | Oil/fat d | Oil/fat e | Oil/fat f |
|---|---|---|---|---|---|---|---|
| Glyceride composition (%) *1 | TG | 13.2 | 13.9 | 14.3 | 99.2 | 12.4 | 14.1 |
| | DG | 85.9 | 85.2 | 84.8 | 0.7 | 81.0 | 84.8 |
| | MG | 0.9 | 0.9 | 0.9 | 0.1 | 6.6 | 1.1 |
| Physical property of oil | Acid value (AV) | 0.37 | 0.38 | 0.35 | 0.36 | 0.42 | 0.38 |
| Fatty acids (%) constituting diglyceride (DG) *2 | C16:0 | 10.5 | 3.7 | 3.1 | n.t. | 10.2 | 5.3 |
| | C18:0 | 4.7 | 1.8 | 1.2 | n.t. | 4.7 | 3.3 |
| | C18:1 (ω9) | 24.7 | 57.0 | 38.2 | n.t. | 27.4 | 18.7 |
| | C18:2 (ω6) | 51.5 | 21.9 | 47.7 | n.t. | 49.3 | 15.4 |
| | C18:3 (ω3) | 6.5 | 10.5 | 7.6 | n.t. | 6.3 | 55.2 |
| Fatty acids (%) constituting triglyceride (TG) *2 | C16:0 | 10.5 | 3.7 | 3.1 | 5.0 | 10.5 | 5.3 |
| | C18:0 | 4.7 | 1.8 | 1.2 | 2.0 | 4.7 | 3.3 |
| | C18:1 (ω9) | 24.7 | 57.0 | 38.2 | 62.2 | 24.7 | 18.7 |
| | C18:2 (ω6) | 51.5 | 21.9 | 47.7 | 19.8 | 51.5 | 15.4 |
| | C18:3 (ω3) | 6.5 | 10.5 | 7.6 | 8.3 | 6.5 | 55.2 |

*1: measured by gas chromatography after trimethylsilylation
*2: measured by gas chromatography after methylation
n.t.: not measured Preparation of an Oil/Fat Compositions:

Oil/fat compositions (A to I) as shown in Table 2 were prepared by using the oils/fats a to f and adding thereto an antioxidant and the other components, respectively.

TABLE 2

| Oil/fat composition No. | | Oil/fat composition A | Oil/fat composition B | Oil/fat composition C | Oil/fat composition D | Oil/fat composition E | Oil/fat composition F | Oil/fat composition G | Oil/fat composition H | Oil/fat composition I |
|---|---|---|---|---|---|---|---|---|---|---|
| Oil/fat sample | No. | Oil a | Oil b | Oil c | Oil c | Oil c | Oil c | Oil d | Oil e | Oil f |
| | weight (g) | 100 | 100 | 100 | 100 | 100 | 100 | 100 | 100 | 100 |
| Antioxidant (parts by weight, in | Tocopherol ("E-mix D"/product of Eisai Co. Ltd.) | 0.5 | 0.5 | 0.5 | 0.5 | 0.5 | 0.5 | 0.5 | 0.5 | 0.5 |

TABLE 2-continued

| Oil/fat composition | No. | Oil/fat composition A | Oil/fat composition B | Oil/fat composition C | Oil/fat composition D | Oil/fat composition E | Oil/fat composition F | Oil/fat composition G | Oil/fat composition H | Oil/fat composition I |
|---|---|---|---|---|---|---|---|---|---|---|
| Oil/fat sample | No. weight (g) | Oil a 100 | Oil b 100 | Oil c 100 | Oil c 100 | Oil c 100 | Oil c 100 | Oil d 100 | Oil e 100 | Oil f 100 |
| the oil/fat composition) | L-ascorbyl palmitate | 0.04 | 0.04 | 0.04 | 0.04 | 0.04 | 0.04 | 0.04 | 0.04 | 0.04 |
| | Catechin ("YK-85"/ product of WMC Co., Ltd.) | — | — | — | 0.05 | 0.05 | 0.05 | — | — | 0.05 |
| | Rosemary extract ("Herberlocks HT-O"/ product of Calsec) | — | — | — | — | 0.5 | — | — | — | 0.5 |
| The other components (parts by weight, In the oil/fat composition) | Phytosterol ("PHS-S"/ product of Tama Biochemical) | — | — | — | — | — | 8 | — | — | — |
| | Phytosterol fatty acid ester ("CARDIOAID-S"/product of ADM) | — | — | — | — | — | — | — | — | 8 |

Example 6: An oil/fat powder was prepared using the raw materials described in Tables 2 and 3 in accordance with the below-described preparation process.

Examples 1 to 5, 7 to 10, 13 and Comparative Examples 1 to 6: Oil/fat powders were prepared as in Example 6 by using the raw materials as described in Tables 2 to 6.

Examples 11 and 12: Oil/fat powders were prepared using the raw materials and preparation process as described in Table 5.

(Preparation Process)

Maltodextrin, sucrose stearate ester, catechin, etc. were added to water and they were mixed. At room temperature, the resulting mixture was stirred at 5000 r/min and 12000 r/min each for 5 minutes in a T.K. homomixer (product of Tokushu Kika Kogyo) to prepare a uniform aqueous phase. The resulting aqueous phase was preliminary emulsified by stirring at 12000 r/min for 20 minutes while adding thereto the oil/fat composition E, whereby a preliminary oil-in-water type emulsion was prepared. The emulsion had a viscosity of 25 mPa·s and an average particle size of about 2.4 μm.

Water was then added to the preliminary emulsion to give a solid content of 30%, followed by homogenizing treatment (34.3 kPa, passing three times) by a homogenizer ("Model 15M-8TA", product of Manton Gaulin) to prepare a Oil-in-water type emulsion.

The resulting emulsion had a viscosity of 12 mPa·s and average particle size of 0.6 μm.

The emulsion thus obtained was spray dried (feeding rate: 0.4 kg/hr, air pressure applied: 0.07 MPa, air flow rate: 0.4 m³/min, inlet air temperature: 150° C., outlet air temperature: 80° C.) by a Pulvis/Mini Spray Dryer ("GA-32", parallel type two liquid nozzle system, product of Yamato Scientific Co.), whereby an oil/fat powder (oil content: 67.7%, average particle size: about 350 μm) was prepared (Example 6).

(Viscosity Measuring Method)

The viscosity of the aqueous phase or emulsion was measured using a rotary oscillation viscometer ("Viscomate YM-100A", product of Yamaichi Electronics).

In a 50-mL glass bottle, 40 g of a sample was weighed and the bottle was allowed to stand in a thermostat of 20° C. for 1 hour. An L type probe was then immersed in the sample and three minutes later, the viscosity was measured.

(Particle Size Measuring Method)

The average particle size by volume of the emulsion was measured using a laser diffraction particle size analyzer ("SALD-2100"; product of Shimadzu Corp).

The oil/fat powders obtained above were evaluated in the following manner.

(1) Properties of Oil/Fat Powder (Upon Preparation)

(i) Oil content: calculated based on the amount of raw materials charged upon preparation of an oil/fat powder (ii) Water content: measured using a coulometric moisture meter ("MOISTURE METER CA-06"; product of Mitsubishi Chemical).

(iii) Properties of powder upon preparation: Properties of each powder were evaluated based on the observation results of cake formation and adhesion of the powder to the production line.

A: Free from both cake formation and powder adhesion to the line

B: Slight cake formation and powder adhesion to the line are observed, but they do not pose any problem for production.

C: Cake formation and adhesion of much powder to the line disturb smooth production.

D: Formation of many cakes and severe adhesion of powder to the line disturb production.

(2) Evaluation of Storage Stability

In a 110-mL glass bottle was charged 20 g of an oil/fat powder and it was hermetically sealed. The powder was stored for 2 weeks at 40° C. and RH of 75%. Using the resulting powder as a sample, evaluation on each of the below-described items was conducted.

(1) Properties of Powder

The states of the oil/fat powder sample before and after storage test were visually observed and evaluated in accordance with the below-described criteria:

A: Free of cakes

B: Some cakes exist, but they are broken when pressure is applied.

C: Some cakes exist and they are too hard to be broken by pressure application.

D: Cakes are hard and they have been solidified with an oozed oil or fat.

(2) Dispersibility and Particle Size

In a 110 mL glass bottle was charged 5 g of an oil/fat powder sample before and after storage test. The dispersibility of the oil/fat powder sample when 50 mL of warm water of 80° C. was charged in the bottle was visually observed and evaluated in accordance with the below-described criteria:

In addition, the average particle size by volume of the powder thus dispersed was measured using a laser diffraction particle size analyzer ("SALD-2100", trade name; product of Shimadzu Corp.)

A: good dispersibility (The powder is dispersed promptly and uniformly).

B: Slightly good dispersibility (Some small cakes exist. It takes a little time to dissolve the powder in water, but the powder is finally dispersed uniformly).

C: Slightly poor dispersibility (Cakes exist and some small cakes remain even after longer time is spent on dispersing)

D: Poor dispersibility (Cakes remain even after longer time is spent on dispersing).

(3) Oil Floating

The state of oil floating was visually observed when the dispersibility was evaluated in (2) and it was evaluated in accordance with the following criteria:

A: no oil floating
B: slight oil floating
C: floating of small oil droplets
D: floating of large oil droplets (4) Evaluation of Taste•Texture The taste•texture of the oil/fat powder upon preparation was organoleptically evaluated in accordance with the following criteria:

A: Good (good in oil taste, melting in the mouth and mouth feel)

B: Slightly good (good oil taste, but slightly good in melting in the mouth and mouth feel)

C: Slightly poor (less oil taste, and slightly poor in melting in the mouth and mouth feel)

D: Poor (unpleasant and strange taste, and poor in melting in the mouth and mouth feel)

(5) Evaluation of Odor

The odor (foul odor due to deterioration) of the oil/fat powder sample before and after storage test was organoleptically evaluated based on the following criteria:

A: Good (without a foul odor)
B: Slightly good (with a very little foul odor)
C: Slightly poor (with a little foul odor)
D: Poor (with a strong foul odor)

(6) Stability Against Oxidation

Stability against oxidation was evaluated in accordance with "Standard Analytical Methods for Oils and Fats 2.5.1.2-1996 (CDM test)", ed. by Oil Chemists' Society, Japan.

The evaluation results of Examples 1 to 13 and Comparative Examples 1 to 6 are shown in Tables 7 and 8.

TABLE 3

| Preparation Examples of oil/fat powder | Oil/fat composition | Composition of oil/fat powder | | | | | Preparation method |
|---|---|---|---|---|---|---|---|
| | | Powder forming base | | Emulsifier | Water | Others | |
| Example 1 | A | Maltodextrin (PINEDEX #2 (DE11); product of Matsutani Chemical Industry) | — | Sucrose stearate ester ("S-1170 (HLB = 11); product of Mitsubishi-Kagaku Foods) | | — | Spray drying |
| | 22 g | 75.0 g | | 3.0 g | 150 g | | |
| Example 2 | B | Maltodextrin (PINEDEX #2 (DE11); product of Matsutani Chemical Industry) | Casein Na (Casein Sodium L; product of San-Ei Gen F.F.I.) | Sucrose stearate ester ("S-1170 (HLB = 11); product of Mitsubishi-Kagaku Foods) | | — | Spray drying |
| | 30 g | 65.0 g | 2.0 g | 3.0 g | 200 g | | |
| Example 3 | C | Maltodextrin (TK-16 (DE16); product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | — | Spray drying |
| | 55 g | 38 g | 3.5 g | 3.5 g | 230 g | | |
| Example 4 | D | Maltodextrin (TK-16 (DE16); product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | — | Spray drying |
| | 70 g | 21 g | 4.0 g | 4.0 g | 230 g | | |
| Example 5 | E | Maltodextrin (TK-16 (DE16); product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | — | Spray drying |
| | 70 g | 21 g | 4.0 g | 4.0 g | 230 g | | |
| Example 6 | E | Maltodextrin (TK-16 (DE16); product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | Catechin ("YK-85"; product of YMC) | Spray drying |
| | 70 g | 21 g | 4.0 g | 4.0 g | 230 g | 1 g | |

TABLE 4

| Preparation Examples of oil/fat powder | Oil/fat composition | Powder forming base | Emulsifier | | Water | Others | Producing method |
|---|---|---|---|---|---|---|---|
| Example 7 | F | Maltodextrin ("TK-16 (DE16)"; product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | — | Spray drying |
| | 60 g | 33 g | 4.0 g | 4.0 g | 230 g | | |
| Example 8 | D | Maltodextrin ("TK-16 (DE16)"; product of Matsutani Chemical Industry) | Casein Na (Casein Sodium L; product of San-Ei Gen F.F.I.) | Tetraglycerol monostearate ("MS-310 (HLB = 8.4"; product of Sakamoto Yakuhin Kogyo) | | — | Spray drying |
| | 50 g | 43 g | 3.5 g | 3.5 g | 230 g | | |
| Example 9 | D | Maltodextrin (TK-16 (DE16)"; product of Matsutani Chemical Industry) | Casein Na (Casein Sodium L; product of San-EiGen F.F.I.) | Sucrose stearate ester ("S-1670 (HLB = 16); product of Mitsubishi-Kagaku Foods) | | — | Spray drying |
| | 50 g | 43 g | 3.5 g | 3.5 g Sorbitan monolaurate ("EMASOL L-10 (F) (HLB = 8.6); product of Kao Corp) 0.5 g | 230 g | | |
| Example 10 | D | Maltodextrin ("TK-16 (DE16)"; product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | — | Spray drying |
| | 50 g | 35 g Maltodextrin ("Finetose", product of Sanwa Cornstarch) 8 g | 3.5 g | 3.5 g | 230 g | | |

TABLE 5

| Preparation Examples of oil/fat powder | Oil/fat composition | Powder forming base | Emulsifier | Water | Others | Producing method |
|---|---|---|---|---|---|---|
| Example 11 | D | Maltodextrin (TK-16 (DE16); product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | — | Freeze drying *1 |
| | 50 g | 43 g | 3.5 g | 3.5 g | 150 g | | |
| Example 12 | D | Dextrin (PINEFLOW (DE10); product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | — | Adsorption method *2 |
| | 50 g | 43 g | 3.5 g | 3.5 g | — | | |
| Example 13 | I | Dextrin ("Fibersol 2C" (DE10); product of Matsutani Chemical Industry) | Casein Na (Casein Sodium L; product of San-Ei Gen F.F.I.) | Sucrose stearate ester ("S-1670 (HLB = 16); product of Mitsubishi-Kagaku Foods) | | Catechin ("YK-85" product of YMC) | Spray drying |
| | 50 g | 40 g | 4.0 g | 4.0 g | 230 g | 1 g | |

*1: In a similar manner to that employed in Example 6 except for the use of raw materials shown in Table 5, an oil in water type emulsion was prepared. The resulting emulsion was frozen with liquid nitrogen and then treated by a freeze dryer ("EYELA FD-81", product of Tokyo Rikakikai), whereby the oil/fat powder was prepared.

*2: The raw materials shown in Table 5 except the oil/fat were mixed. To the resulting mixture, the oil/fat was then added in portions and they were mixed. After completion of the addition, the mixture was stirred to be uniform, whereby the oil/fat powder was prepared.

TABLE 6

| Preparation Examples of oil/fat powder | Composition of oil/fat powder | | | | | | Producing method |
|---|---|---|---|---|---|---|---|
| | Oil/fat composition | Powder forming base | Emulsifier | | Water | Others | |
| Comparative Example 1 | G 55 g | Maltodextrin (TK-16(DE16); product of Matsutani Chemical Industry) 38 g | Casein Na (Casein Sodium L; product of San-Ei Gen F.F.I.) 3.5 g | Sucrose stearate ester ("S-1670 (HLB = 16); product of Mitsubishi-Kagaku Foods) 3.5 g | 230 g | — | Spray drying |
| Comparative Example 2 | C 8.5 g | Maltodextrin (TK-16 (DE16); product of Matsutani Chemical Industry) 84.5 g | Casein Na (Casein Sodium L; product of San-Ei Gen F.F.I.) 3.5 g | Sucrose stearate ester ("S-1670 (HLB = 16); product of Mitsubishi-Kagaku Foods) 3.5 g | 230 g | — | Spray drying |
| Comparative Example 3 | D 90 g | Maltodextrin (TK-16 (DE16); product of Matsutani Chemical Industry) 2.0 g | Casein Na (Casein Sodium L; product of San-Ei Gen F.F.I.) 4.0 g | Sucrose stearate ester ("S-1670 (HLB = 16); product of Mitsubishi-Kagaku Foods) 4.0 g | 230 g | — | Spray drying |
| Comparative Example 4 | H 50 g | Maltodextrin (TK-16 (DE16); product of Matsutani Chemical Industry) 43 g | Casein Na (Casein Sodium L; product of San-Ei Gen F.F.I.) 3.5 g | Sucrose stearate ester ("S-1670 (HLB = 16); product of Mitsubishi-Kagaku Foods) 3.5 g | 230 g | — | Spray drying |
| Comparative Example 5 | A 50 g | Maltodextrin (TK-16 (DE16); product of Matsutani Chemical Industry) 43 g | Casein Na (Casein Sodium L; product of San-Ei Gen F.F.I.) 3.5 g | Monoglyceride ("EXCEL 0-95" (HLB = 3.8); product of Kao Corp) 3.5 g | 230 g | — | Spray drying |
| Low in HLB Comparative Example 6 | A 50 g | Maltodextrin (TK-16 (DE16); product of Matsutani Chemical Industry) 43 g | Casein Na (Casein Sodium L; product of San-Ei Gen F.F.I.) 3.5 g | Sucrose stearate ester ("S-1670 (HLB = 16); product of Mitsubishi-Kagaku Foods) 3.5 g | 400 g | — | Spray drying |

TABLE 7

| Preparation example of oil/fat powder | Properties of oil/fat powder (upon preparation) | | | | | | | Stability against oxidation (hr) | Storage stability (40° C./75%, 2 weeks) | | | | |
|---|---|---|---|---|---|---|---|---|---|---|---|---|---|
| | Properties of powder upon preparation | Oil content (%) | Water content (%) | State of dispersion in water | | | Taste and texture | | Properties of powder after storage | State of dispersion in water | | | Odor |
| | | | | Particle size (μm) | Dispersibility | Oil floating | | | | Particle size (μm) | Dispersibility | Oil floating | |
| Ex. 1 | B | 21.2 | 3.5 | 3.2 | B | A | B | 6.1 | B | 4.1 | B | A | A |
| Ex. 2 | B | 28.9 | 3.6 | 3.0 | B | A | B | 6.4 | B | 4.0 | B | A | A |
| Ex. 3 | A | 53.4 | 3.0 | 2.8 | A | A | A | 10.8 | A | 3.2 | A | A | A |
| Ex. 4 | A | 68.5 | 3.1 | 3.3 | A | A | A | 12.8 | A | 3.6 | A | A | A |
| Ex. 5 | A | 68.4 | 3.3 | 3.4 | A | A | A | 15.4 | A | 3.8 | A | A | A |
| Ex. 6 | A | 67.7 | 3.3 | 3.5 | A | A | A | 17.1 | A | 3.8 | A | A | A |
| Ex. 7 | A | 57.6 | 3.1 | 4.1 | A | A | A | 11.3 | A | 4.7 | A | A | A |
| Ex. 8 | B | 48.3 | 3.5 | 3.8 | A | A | A | 10.1 | B | 4.3 | A | B | A |
| Ex. 9 | B | 48.1 | 3.4 | 3.6 | A | A | A | 9.4 | B | 4.1 | A | B | A |
| Ex. 10 | B | 47.8 | 4.4 | 3.8 | A | A | A | 11.1 | A | 4.4 | A | A | A |
| Ex. 11 | *1 | 48.4 | 3.3 | 3.3 | A | A | A | 11.5 | A | 4.6 | A | A | B |
| Ex. 12 | *2 | 48.1 | 3.8 | 4.5 | A | B | A | 6.6 | B | 5.6 | A | B | B |
| Ex. 13 | A | 48.2 | 3.7 | 3.6 | A | A | A | 9.8 | A | 4.2 | A | A | A |

*1: freeze drying
*2: adsorption method

TABLE 8

| Preparation example of oil/fat powder | Properties of oil/fat powder (upon preparation) | | | | | | | Stability against oxidation (hr) | Storage stability (40° C./75%, 2 weeks) | | | | |
|---|---|---|---|---|---|---|---|---|---|---|---|---|---|
| | Properties of powder upon preparation | Oil content (%) | Water content (%) | State of dispersion in water | | | Taste and texture | | Properties of powder after storage | State of dispersion in water | | | Odor |
| | | | | Particle size (μm) | Dispersibility | Oil floating | | | | Particle size (μm) | Dispersibility | Oil floating | |
| Comp. Ex. 1 | D | 52.7 | 4.2 | 5.1 | B | C | A | 5.4 | D | 21.2 | D | D | C |
| Comp. Ex. 2 | B | 8.2 | 3.5 | 3.0 | B | A | C | 10.6 | B | 5.4 | C | B | C |

TABLE 8-continued

| Preparation example of oil/fat powder | Properties of oil/fat powder (upon preparation) | | | | | | | | Storage stability (40° C./75%, 2 weeks) | | | | |
|---|---|---|---|---|---|---|---|---|---|---|---|---|---|
| | | | | State of dispersion in water | | | | Stability | | | | | |
| | Properties of powder upon preparation | Oil content (%) | Water content (%) | Particle size (μm) | Dispersibility | Oil floating | Taste and texture | against oxidation (hr) | Properties of powder after storage | State of dispersion in water | | | |
| | | | | | | | | | | Particle size (μm) | Dispersibility | Oil floating | Odor |
| Comp. Ex. 3 | D | Unstable emulsion (with oil separation). Caking occurred owing to oozing-out of an oil onto the powder surface during spray drying. | | | | | | | | | | | |
| Comp. Ex. 4 | B | 47.6 | 4.8 | 4.3 | B | A | D | 5.1 | C | 7.3 | C | C | C |
| Comp. Ex. 5 | B | 47.6 | 4.7 | 4.5 | B | B | D | 5.2 | C | 7.0 | C | C | C |
| Comp. Ex. 6 | C | 46.6 | 6.8 | 4.7 | B | A | B | 4.8 | D | Caking occurred | | | C |

As is apparent from the results of Tables 3 to 8, the oil/fat powders of the present invention exhibited preparation with ease, excellent long-term storage stability, good dispersibility in water and favorable taste and texture.

In the below-described Application Examples 1 to 7, foods were prepared using the oil/fat powders obtained in Example 6 or 13 and Comparative Example 1.

Application Example 1

Powder Drink

A powder drink having the following composition was prepared.

| Oil/fat powder | 70 (parts by weight) |
|---|---|
| Cocoa powder | 10 |
| Skim milk | 8 |
| Lactose | 5 |
| Powder sugar | 5 |
| Cacao powder | 2 |

In a shaker were charged 40 parts by weight of the powder drink thus prepared and 200 parts by weight of milk. By sufficient stirring of the resulting mixture, a cocoa drink was prepared.

Application Example 2

Corn Soup Powder

A corn soup powder having the following composition was prepared.

| Oil/fat powder | 60 (parts by weight) |
|---|---|
| Sweet corn powder | 15 |
| Skim milk | 8 |
| Lactose | 5 |
| Powder sugar | 5 |
| Corn starch | 3 |
| Powder salt | 2 |
| Sodium glutamate | 1.2 |
| Onion extract | 0.2 |
| Chicken extract | 0.2 |
| Yeast extract | 0.2 |
| Pepper powder | 0.2 |

In 40 parts by weight of the corn soup powder thus prepared was poured 120 parts by weight of boiling water, followed by sufficient stirring, whereby a corn soup was prepared.

Application Example 3

Coffee-Cream Powder

The coffee-cream powder having the following composition was prepared.

| Oil/fat powder | 80 (parts by weight) |
|---|---|
| Skim milk | 15 |
| Lactose | 5 |

In 100 mL of water was added 2 g of a commercially available instant coffee, followed by heating at 80° C. Then, the coffee-cream powder prepared above was added and stirred.

Application Example 4

Biscuit

The below-described raw materials were mixed by the sugar batter method. The resulting mixture was rolled out into a thickness of about 3 to 5 mm and then, cut with a cookie cutter. The resulting pieces were baked in an oven (at 180° C. for 15 minutes), whereby biscuits were prepared.

| Wheat flour | 30 (parts by weight) |
|---|---|
| Oil/fat powder | 20 |
| Egg | 12 |
| Shortening | 12 |
| Sugar | 12 |
| Maltose | 8 |
| Butter (salt free) | 4 |
| Butter flavor | 1.3 |
| Baking powder | 0.4 |
| Vanilla essence | 0.2 |
| Salt | 0.1 |

Application Example 5

Tablets

The below-described raw materials were mixed, followed by tableting, whereby tablets, each 300 mg, were prepared.

| Oil/fat powder | 60 (parts by weight) |
|---|---|
| Crystalline cellulose | 20 |
| Corn starch | 10 |
| Lactose | 5 |
| Grape fruits flavor | 2 |
| Powdered fruits of grapefruits | 2 |
| Magnesium stearate | 0.5 |
| Silicic anhydride | 0.5 |

Application Example 6

Supplement Granules

The below-described raw materials were mixed. To the resulting mixture, 5 parts by weight of water was added as a binder and they were mixed, followed by granulation under stirring, whereby supplement granules were prepared.

| Oil/fat powder | 80 parts by weight |
|---|---|
| Crystalline cellulose | 5 |
| Corn starch | 5 |
| Lactose | 5 |
| Grape fruits flavor | 2 |
| Powdered fruits of grapefruits | 2 |
| Magnesium stearate | 0.5 |
| Silicic anhydride | 0.5 |

Application Example 7

Biscuit

As in Application Example 4 except for the use of the oil/fat powder obtained in Example 13, biscuits were prepared.

The foods obtained in Application Examples 1 to 7 were evaluated in a similar manner to that employed for the evaluation of the oil/fat powder. The results are shown in Table 9.

TABLE 9

| Application Examples | | Properties upon preparation | Properties of product | | | Storage stability (at 40° C. for 2 weeks) | | | | |
|---|---|---|---|---|---|---|---|---|---|---|
| | | | Dispersibility | Oil floating | Taste texture | Properties of product after storage (powder) | Properties of product after storage (solid) | Dispersibility | Oil floating | Odor |
| 1 (Powder drink) | Ex. 6 | The powder obtained in Example 6 exhibited better miscibility with the other raw material powders. | A | A | A | A | — | A | A | A |
| | Comp. Ex. 1 | | B | C | A | D | — | C | D | B |
| 2 (Soup powder) | Ex. 6 | | A | A | A | A | — | A | A | A |
| | Comp. Ex. 1 | | B | C | A | D | — | C | D | B |
| 3 (Coffee-cream powder) | Ex. 6 | | A | A | A | A | — | A | A | A |
| | Comp. Ex. 1 | | B | C | A | D | — | C | D | B |
| 4 (Biscuit) | Ex. 6 | The powder obtained in Ex. 6 exhibited better miscibility with the other raw material powders. Upon baking of the dough, oil oozing therefrom was less in the product using the oil/fat obtained in Ex. 6. | — | — | A | — | A | — | — | A |
| | Comp. Ex. 1 | | — | — | B | — | D | — | — | C |
| 5 (Tablet) | Ex. 6 | | — | — | A | — | A | — | — | A |
| | Comp. Ex. 1 | | — | — | B | — | D | — | — | C |
| 6 (Supplement) | Ex. 6 | | — | — | A | — | A | — | — | A |
| | Comp. Ex. 1 | | — | — | B | — | D | — | — | C |
| 7 (Biscuit) | Ex. 13 | The oil/fat powder obtained in Ex. 13 exhibited better miscibility with the other raw material powders. Upon baking of the dough, oil oozing therefrom was less in the product using the oil/fat obtained in Ex. 13. | — | — | A | — | A | — | — | A |
| | Comp. Ex. 1 | | — | — | B | — | D | — | — | C |

\* Evaluation in Application Example including the characteristics of product (in the powder form) after storage was carried out in a similar manner to that employed for the evaluation of the oil/fat powder.
\* The properties of the product (in the solid form) after storage were visually observed and evaluated in accordance with the below-described criteria.
A: Free from oozing-out of oil
B: Very slight oozing out
C: Slight oozing out
D: Much oozing out.

INDUSTRIAL APPLICABILITY

The diglyceride-containing oil/fat powder according to the invention exhibits good taste, and excellent dispersibility in water and storage stability. Moreover, it exhibits good handling use and workability when used it to food, can be used readily for various forms of food. Foods containing this oil/fat powder have good taste and storage stability.

The invention claimed is:

1. An oil/fat powder comprising the following Components (A), (B) and (C): (A) 15 to 79.9 wt. % of a glyceride mixture containing 8 to 29.9 wt. % of triglycerides, 0.1 to 5 wt. % of monoglycerides and 70 to 91.9 wt. % wt. % of diglycerides and having, as at least 50 wt. % of all the constitutive fatty acids, unsaturated fatty acids; (B) 20 to 84.9 wt. % of one or at least two powder forming bases selected from carbohydrates, proteins and peptides; (C) 0.1 to 5 wt. % of water.

2. The oil/fat powder of claim 1, further comprising 0.01 to 5 parts by weight of an antioxidant, based on 100 parts by weight of Component (A).

3. The oil/fat powder of claim 1 or 2, further comprising 0.05 to 20 parts by weight of a phytosterol, based on 100 parts by weight of Component (A).

4. The oil/fat powder of any one of claims 1 to 2, further comprising 0.1 to 20 parts by weight of an emulsifier having an HLB value of 7 or greater, based on 100 parts by weight of Component (A).

5. A processed food comprising the oil/fat powder of any one of claims 1 to 2.

6. The oil/fat powder of claim 1, wherein 70–100 wt. % of constitutive fatty acids of said diglyceride are $C_{16-22}$ unsaturated fatty acids.

7. The oil/fat powder of claim 1, comprising 30 to 74.9 % of said glyceride mixture.

8. The oil/fat powder of claim 1, comprising at least 15 wt. % of 1,3-diglyceride.

9. The oil/fat powder of claim 1, wherein 15 to 90% of the constitutive fatty acids of said diglyceride are ω3 unsaturated fatty acids.

10. The oil/fat powder of claim 1, wherein 1 to 60% of the constitutive fatty acids of said diglyceride are ω9 unsaturated fatty acids.

11. The oil/fat powder of claim 1, comprising 3.5 wt. % or less of linear free fatty acids.

12. The oil/fat powder of claim 1, wherein 70 to 100% of the constitutive fatty acids of said glyceride mixture are unsaturated fatty acids.

13. The oil/fat powder of claim 1, wherein said powder forming bases is selected from the group consisting of a protein, a peptide and a mixture thereof.

14. The oil/fat powder of claim 1, wherein said powder forming bases is selected from the group consisting of sugar alcohols, starches, polysaccharide thickeners, gum substances, derivatives of milk, derivatives of egg, derivatives of meat, derivatives of wheat, derivatives of rice, derivatives of soybean, derivatives of corn and a mixture thereof.

15. The oil/fat powder of claim 1, wherein said powder forming bases is selected from the group consisting of glucose, fructose, maltose, lactose, sucrose, trehalose, corn starch, potato starch, tapioca starch, dextrin, cyclodextrin, oxidized starch, starch ester, starch ether, crosslinked starch, alpha starch or octenylsuccinate ester, processed starch, polysaccharide thickener gum substance derived from seaweed, polysaccharide thickener gum substance derived from seed, polysaccharide thickener gum substance derived from microorganism, polysaccharide thickener gum substance derived from resin, pullulan, sodium alginate, xanthan gum, guar gum, locust bean gum, tragacanth gum, tamarind gum, carrageenan, furcellaran, gum arabic, Gellan gum, psyllium, curdlan, konjac mannan, pectin, agar, carboxymethyl cellulose, casein, whey, gelatin, skim milk, soybean globulin, egg albumen, and yolk protein and a mixture thereof.

16. The oil/fat powder of claim 1, wherein said powder has a weight average particle size of from 250 to 3500 μm.

* * * * *